US010572893B2

(12) United States Patent
Arora et al.

(10) Patent No.: US 10,572,893 B2
(45) Date of Patent: Feb. 25, 2020

(54) DISCOVERING AND INTERACTING WITH PROXIMATE AUTOMOBILES

(71) Applicant: International Business Machines Corporation, Armonk, NY (US)

(72) Inventors: Pritpal S. Arora, Bangalore (IN); Bijo S. Kappen, Bangalore (IN); Gopal S. Pingali, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 15/183,819

(22) Filed: Jun. 16, 2016

(65) Prior Publication Data

US 2017/0364942 A1 Dec. 21, 2017

(51) Int. Cl.
*G06Q 30/02* (2012.01)
*G06Q 50/00* (2012.01)

(52) U.S. Cl.
CPC ......... *G06Q 30/0236* (2013.01); *G06Q 50/01* (2013.01)

(58) Field of Classification Search
CPC .................. G06Q 30/0236; G06Q 50/01
See application file for complete search history.

(56) References Cited

U.S. PATENT DOCUMENTS

| | | | | |
|---|---|---|---|---|
| 6,993,587 B1 * | 1/2006 | Basani | ................ | H04L 67/1095 709/229 |
| 8,150,608 B2 | 4/2012 | Cobbold | | |
| 9,401,937 B1 * | 7/2016 | Gottlieb | .................. | H04L 67/24 |
| 2007/0223436 A1 * | 9/2007 | Lenardi | .................. | H04L 63/10 370/338 |
| 2010/0010826 A1 * | 1/2010 | Rosenthal | .............. | G06Q 99/00 705/1.1 |
| 2011/0087745 A1 * | 4/2011 | O'Sullivan | ............ | G06Q 10/10 709/206 |

(Continued)

FOREIGN PATENT DOCUMENTS

| | | | | |
|---|---|---|---|---|
| CN | 202115298 U | 1/2012 | | |
| EP | 2975592 A1 * | 1/2016 | ............. | G08G 1/333 |

(Continued)

OTHER PUBLICATIONS

Stephan Olariu and et al. 2011. Taking VANET to the clouds. International Journal of Pervasive Computing and Communications 7, 1 (2011), 7-21. (Year: 2011).*

(Continued)

*Primary Examiner* — Michael Bekerman
*Assistant Examiner* — Scott Snider
(74) *Attorney, Agent, or Firm* — Edward J. Wixted, III

(57) ABSTRACT

As disclosed herein a computer-implemented method includes identifying, by a first automobile, a proximate automobile, and determining a trust score corresponding to the proximate automobile. The method further includes conducting an affinity group qualification process responsive to the trust score exceeding a selected threshold value, and inviting the proximate automobile into the affinity group responsive to the proximate automobile passing the affinity group qualification process. A computer program product and a computer system corresponding to the above method are also disclosed herein.

20 Claims, 7 Drawing Sheets

(56) References Cited

U.S. PATENT DOCUMENTS

| | | | |
|---|---|---|---|
| 2011/0238755 A1* | 9/2011 | Khan | H04W 4/21 |
| | | | 709/204 |
| 2013/0030811 A1 | 1/2013 | Olleon et al. | |
| 2013/0086164 A1* | 4/2013 | Wheeler | H04W 4/023 |
| | | | 709/204 |
| 2014/0200739 A1 | 7/2014 | Kirsch | |
| 2014/0364119 A1* | 12/2014 | Bradley | H04W 36/24 |
| | | | 455/436 |
| 2016/0337375 A1* | 11/2016 | Bray | H04L 63/107 |
| 2017/0287233 A1* | 10/2017 | Nix | G07C 5/008 |

FOREIGN PATENT DOCUMENTS

| | | |
|---|---|---|
| WO | 200505636 A1 | 6/2005 |
| WO | 2013105115 A2 | 7/2013 |

OTHER PUBLICATIONS

Eltoweissy, Mohamed, Stephan Olariu and Mohamed F. Younis. "Towards Autonomous Vehicular Clouds—A Position Paper (Invited Paper)." ADHOCNETS (2010). (Year: 2010).*

* cited by examiner

DISCOVERING AND INTERACTING WITH PROXIMATE AUTOMOBILES

BACKGROUND

The present invention relates to business and social networking, and more particularly business and social networking with automobiles.

Throughout the course of a day, an automobile may encounter numerous other automobiles. In some instances, the encounter may include two or more automobiles passing each other on a road. In other instances, the encounter may include the automobiles being near each other without actually passing. For example, an automobile in a parking facility is near all other automobiles in the parking facility. Additionally, the same automobile in the parking facility may also be near automobiles driving on a nearby highway. It is also possible that the automobile may be near or pass the same automobile multiple times over the course a day, and over an extended period (e.g., weeks, months, or years), the two automobiles may be frequently proximate.

SUMMARY

As disclosed herein a computer-implemented method includes identifying, by a first automobile, a proximate automobile, and determining a trust score corresponding to the proximate automobile. The method further includes conducting an affinity group qualification process responsive to the trust score exceeding a selected threshold value, and inviting the proximate automobile into the affinity group responsive to the proximate automobile passing the affinity group qualification process. A computer program product and a computer system corresponding to the above method are also disclosed herein.

DETAILED DESCRIPTION

As an operator of an automobile drives the automobile throughout the day, the automobile may pass numerous other automobiles. The possibility exists that during a commute to or from work, to the supermarket, or to a local community center or school, that the automobile passes, one or more times each day, many other automobiles. In addition to passing other automobiles on the road, the automobile may also be near many other automobiles that are stationary one or more times each day. The possibility exists that the automobile passes or is near many of the same other automobiles one or more times each day.

When automobiles pass each other frequently, a possibility may exist to recognize relationships between these automobiles. Operators of automobiles that are frequently in the same proximity may have other similarities, such as, but not limited to, visiting a common place of employment, visiting the same gym, visiting the same supermarket, purchasing gasoline at the same location, frequently visiting the same coffee shop, or visiting the same auto repair station.

The embodiments disclosed herein recognize that identifying common relationships between the automobiles may enable the automobiles to form groups, such as business and social groups, and share information that may benefit operators of automobiles that are members of the group. The present invention leverages the above observation and will now be described in detail with reference to the Figures.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1A:
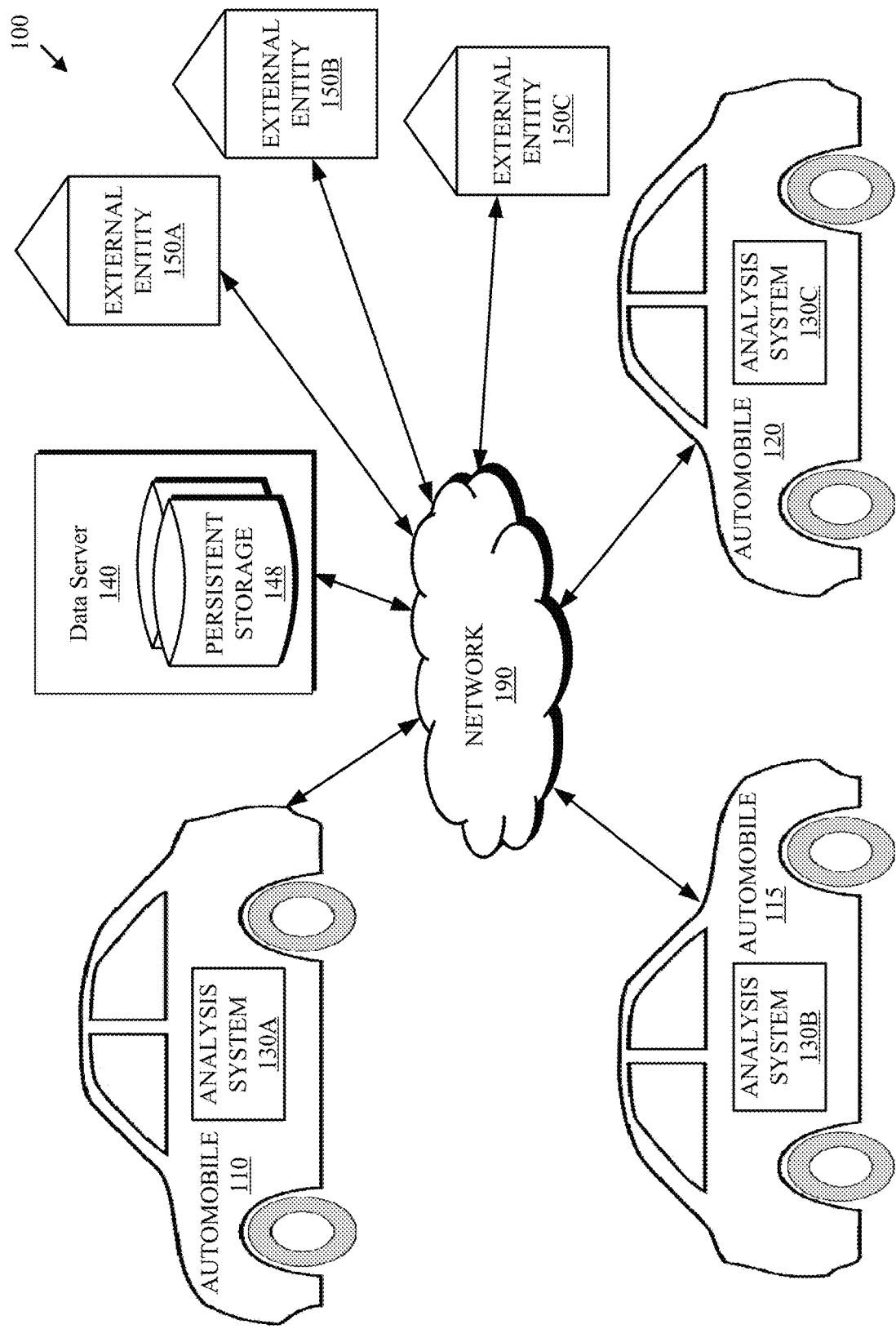
FIG. 1A is a functional block diagram depicting an automobile communication environment, in accordance with at least one embodiment of the present invention.

FIG. 1A is a functional block diagram depicting an automobile communication environment 100, in accordance with at least one embodiment of the present invention. As depicted, automobile communication environment 100 includes automobile 110, automobile 115, and automobile 120. Automobile 110 is currently immobile (e.g., parked in a parking facility, parked in a parking lot at a place of employment, or sitting at the residence of the owner of automobile 110). Automobile 115 and automobile 120 are in motion (i.e., mobile), and may pass each other during their travels. Automobile 115 and automobile 120 may also pass near parked automobile 110.

As depicted, automobile communication environment 100 also includes data server 140, and external entities 150A, 150B, and 150C. An external entity is any business or merchant that may provide special opportunities (e.g., deals) to select patrons. External entities 150A, 150B, and 150C are locations (e.g., coffee shops, gas stations, or repair stations) that may be visited by automobiles 110, 115, and 120.

Automobiles 110, 115, and 120 each include analysis system 130 (e.g., analysis system 130A, analysis system 130B, and analysis system 130C). Analysis system 130 may enable automobiles 110, 115, and 120 to communicate with each other as well as data server 140, and external entities 150A, 150B, and 150C over network 190. Analysis systems 130A, 130B, and 130C, and other electronic devices (not shown) communicate over network 190. Network 190 can be, for example, a connection over wifi, cellular telephone, Bluetooth, dedicated short-range communication (DSRC), vehicle-to-vehicle (V2V) communication, or a combination there of. In general, network 190 can be any combination of connections and protocols that will support communications between analysis system 130, data server 140, and external entities 150A, 150B, and 150C in accordance with an embodiment of the present invention.

Analysis system 130 may detect proximate automobiles, and gather identifying information corresponding to the proximate automobiles or operators thereof. Analysis system 130 will be described in greater detail with regard to FIG. 1B. The information gathered by analysis system 130 may be stored on data server 140. Data server 140 can be smart phones, tablets, desktop computers, laptop computers, specialized computer servers, or any other computer systems, known in the art, capable of communicating over network 190. In some embodiments, data server 140 represents computer systems utilizing clustered computers and components to act as a single pool of seamless resources. In other embodiments, data server 140 is a cloud resource that is accessed over network 190. In general, data server 140 is representative of any electronic devices, or combination of electronic devices, capable of executing machine-readable program instructions, as described in greater detail with regard to FIG. 6.

Data server 140 includes persistent storage 148 that may be used to store data received from analysis system 130. Persistent storage 148 may be any non-volatile storage media known in the art. For example, persistent storage 148 can be implemented with a tape library, optical library, one or more independent hard disk drives, or multiple hard disk drives in a redundant array of independent disks (RAID). Similarly, data on persistent storage 148 may conform to any suitable storage architecture known in the art, such as a file, a relational database, an object-oriented database, and/or one or more tables.

Figure 1B:
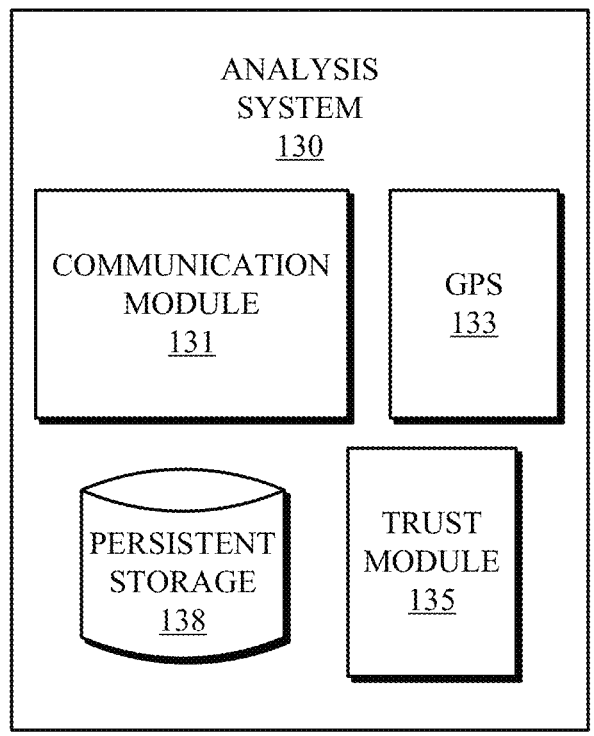
FIG. 1B is a functional block diagram depicting an analysis system, in accordance with at least one embodiment of the present invention.

FIG. 1B is a functional block diagram depicting analysis system 130, in accordance with at least one embodiment of the present invention. As depicted, analysis system 130 includes communication module 131, Global Positioning System (GPS) 133, trust module 135, and persistent storage 138. Analysis system 130 may enable an automobile to detect a proximate automobile. In some embodiments, analysis system 130 detects proximate automobiles using Radio-Frequency Identification (RFID) tags attached to automobiles. In some embodiments, analysis system 130 detects proximate automobiles using GPS tracking technology (similar to tracking the location of a smartphone). In some embodiments, analysis system 130 detects proximate automobiles using video detection of an identification tag (e.g., a license plate or registration tag). Using communication module 131, analysis system 130 may also communicate with the proximate automobile, retrieve and store data on data server 140, and negotiate with external entities 150 (e.g., gas stations, coffee shops, and repair stations). In some embodiments, communication module 131 enables operators of proximate automobiles to communicate with each other.

Analysis system 130 may use GPS 133 to determine the location (i.e., GPS coordinates) in which a proximate automobile was detected. GPS 133 may provide the location of both the automobile (i.e., the automobile doing the detecting) and the location of the detected proximate automobile, hereinafter detected automobile. In some embodiments, the GPS also provides the date and time that the proximate automobile was detected. In some embodiments, GPS 133 is part of a factory installed automotive navigation system that communicates with analysis system 130. In other embodiments, GPS 133 is a hand-held GPS device (e.g., a dedicated GPS or a hand held smart device that includes GPS functionality) that communicates with analysis system 130. In some other embodiments, GPS 133 is an add-on GPS device that is permanently attached to the automobile.

Trust module 135 may be configured to calculate a trust score corresponding to the proximate automobile. The trust score may be used to determine if the proximate automobile qualifies for entry in a social grouping of automobiles. Proximate automobiles that are detected more frequently may receive a higher (more trustworthy) trust score. In some embodiments, the trust score is calculated using a frequency of meeting, proximity of the meetings, time frame of the meetings, and a vehicle safety score corresponding to the proximate automobile. In some embodiments, the trust score is calculated using a vehicle safety score corresponding to the proximate automobile, and group preference scores (e.g., trust scores corresponding to membership in other groups).

Analysis system 130 can be a smart phone, tablet, laptop computer, specialized computer, or any other computer system, known in the art, capable of communicating over network 190. Analysis system 130 may store information corresponding to a detected automobile (e.g., number of times detected, detection location, detection date and time, etc) on persistent storage 138, enabling trust module 135 to reference locally stored data to determine a trust score for the detected automobile. After the detected automobile is a member of a group, information corresponding to a detected automobile may be stored on data server 140.

Figure 2:
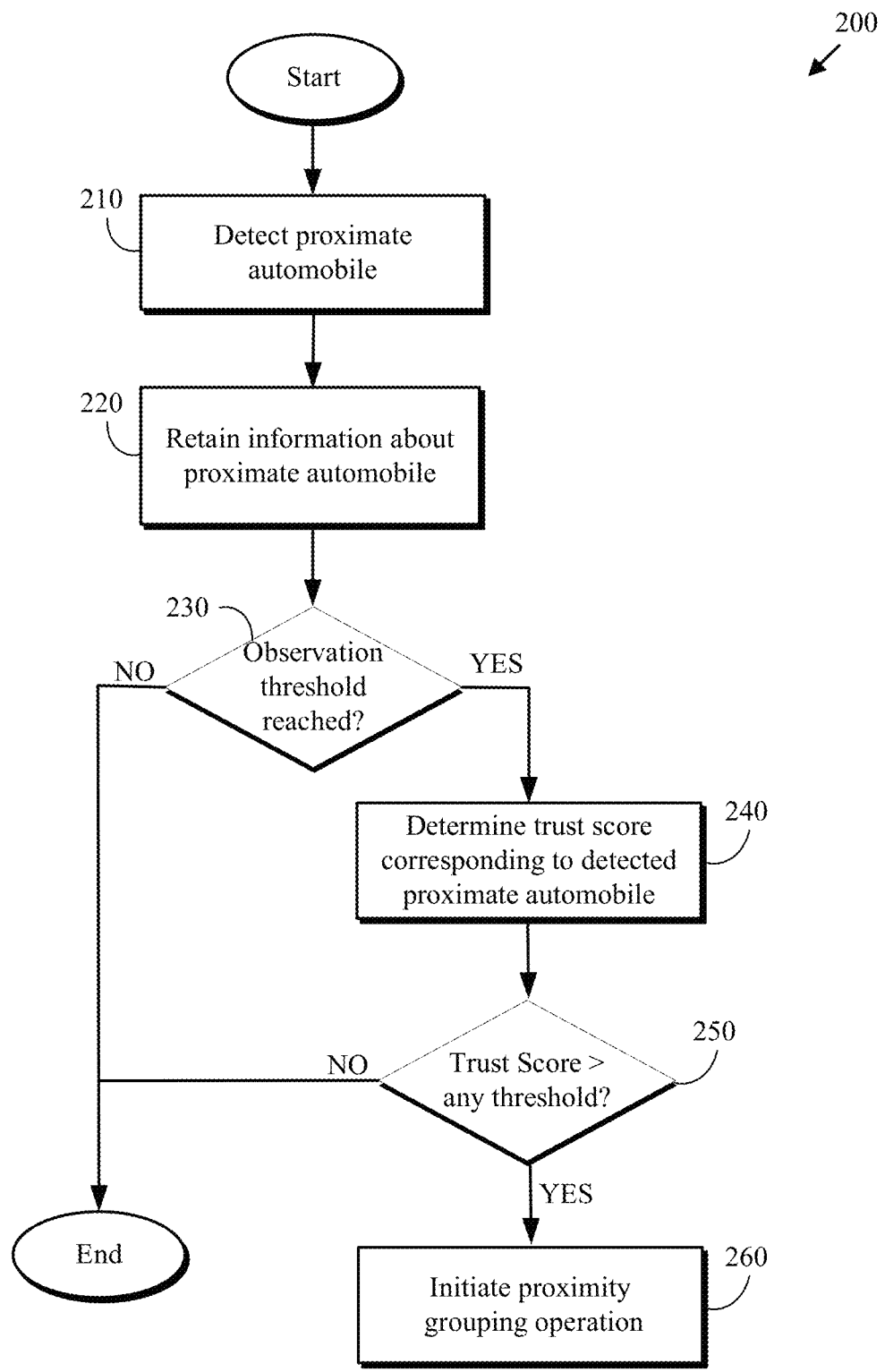
FIG. 2 is a flowchart depicting an automobile detection method, in accordance with at least one embodiment of the present invention.

FIG. 2 is a flowchart depicting automobile detection method 200, in accordance with at least one embodiment of the present invention. As depicted, automobile detection method 200 includes detecting (210) a proximate automobile, retaining (220) information about the proximate automobile, determining (230) whether an observation threshold has been reached, determining (240) a trust score, determining (250) whether any thresholds have been reached, and initiating (260) a proximity grouping operation. Automobile detection method 200 enables a first automobile to detect a proximate automobile and determine if the proximate automobile is one that is frequently encountered.

Detecting (210) a proximate automobile may include analysis system 130 corresponding to a first automobile detecting a proximate automobile that is within a selected range of the first automobile. The first automobile, while traveling on a highway may detect a proximate automobile as the two automobiles approach and potentially pass each other. Additionally, the first automobile may be traveling on a highway and detect a proximate automobile that is parked in a parking facility near the highway. Alternatively, the first automobile may be immobile (e.g., parked at the home of the owner) and detect a proximate automobile that is within a selected range (e.g., a proximate automobile that passes on a road near the parked automobile, or a proximate automobile parked at a nearby neighbor's house).

In some embodiments, the proximate automobile is detected using RFID chips and technology (e.g., automobiles have RFID chips attached that are detected by analysis system 130). In some embodiments, the proximate automobile is detected using GPS tracking technology (e.g., personal GPS tracking or real-time GPS tracking) that enables an auto to continually transmit identification information. In some embodiments, the proximate automobile is detected using cellphone towers and cellphone signals.

Retaining (220) information about the proximate automobile may include analysis system 130 associating the proximate automobile with a unique vehicle ID. In some embodiments the unique vehicle ID is obtained during the detecting (210) operation. For example, the unique vehicle ID may be an identifier received from an RFID chip, or a GPS ID received from a GPS corresponding to the proximate automobile. Analysis system 130 may record and retain information (e.g., unique vehicle ID, number of times detected, date, time, location, group memberships, etc.) corresponding to the detected automobile. In some embodiments, analysis system 130 retains information, corresponding to the detected automobile, on persistent storage 138. In other embodiments, analysis system 130 retains information, corresponding to the detected automobile, on data server 140. If the detected automobile has not been previously detected, a new entry is created and saved. If the detected automobile has been previously detected, the existing data is updated (e.g., the number of times detected may be incremented, and date, time, and location information added).

Determining (230) whether an observation threshold has been reached may include analysis system 130 analyzing the retained information corresponding to the detected automobile. There may be various observation thresholds to be checked. The thresholds maybe configurable, in that, new thresholds may be added while others may be removed, and the value corresponding to a threshold may be altered.

Observation thresholds that analysis system 130 checks may include, but are not limited to: (i) total number of times the detected automobile has been observed; (ii) the number of times the detected automobile has been observed in same approximate location; (iii) the number of times the detected automobile has been observed at the same time of the day; and (iv) the number of times the detected automobile has been observed on the same day of the week. If an observation threshold has been reached, then automobile detection method 200 proceeds to determine a trust score operation 240. Otherwise, automobile detection method 200 terminates until another automobile is detected.

Determining (240) a trust score may include analysis system 130 analyzing the retained information corresponding to the detected automobile and utilizing trust module 135 to calculate a trust score. The trust score may be used to determine if the detected automobile qualifies for entry in a social grouping of automobiles. Proximate automobiles that are detected more frequently may receive a higher (more trustworthy) trust score. In some embodiments, the trust score is calculated using a frequency of meeting, location of the meetings, time frame of the meetings, and a vehicle safety score (VSS) corresponding to the detected automobile. A VSS may be calculated using information retrieved from external sources (e.g., data server 140) such as, but not limited to, accident history, maintenance records, traffic/parking violations, ratings from other automobiles, and ratings from external agencies (e.g., an intelligent transport system rating).

Determining (250) whether any thresholds have been reached may include analysis system 130 comparing the calculated trust score with one or more selected threshold values to determine if the trust score has reached any of the one or more selected threshold values. Each threshold value may represent a minimum required trust score to be invited to join a specific group. If a trust score is reached, then automobile detection method 200 proceeds to initiate a proximity grouping operation 260. Otherwise, automobile detection method 200 terminates until another automobile is detected.

Initiating (260) a proximity grouping operation may include analysis system 130 inviting the detected automobile to a proximity group. The proximity grouping operation will be described in greater detail with regard to FIG. 3.

Figure 3:
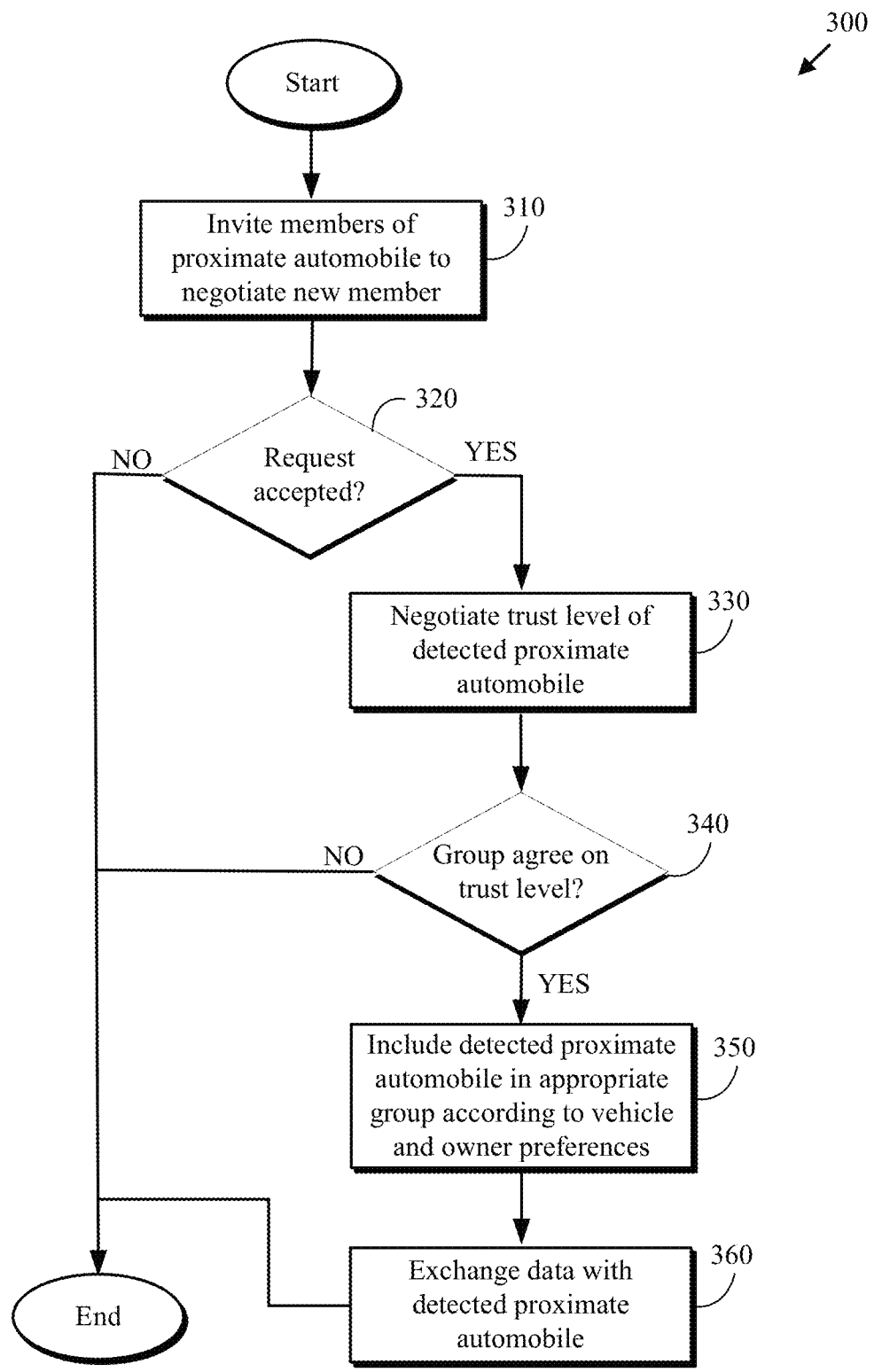
FIG. 3 is a flowchart depicting a proximity group invitation method, in accordance with at least one embodiment of the present invention.

FIG. 3 is a flowchart depicting proximity group invitation method 300, in accordance with at least one embodiment of the present invention. As depicted, proximity group invitation method 300 includes inviting (310) members of a proximity group to negotiate, determining (320) whether the request was accepted, negotiating (330) a trust level, determining (340) whether an agreement was reached, including (350) the detected automobile in a group, and exchanging (360) data. Proximity group invitation method 300 enables the addition of a detected automobile to a proximity group.

Inviting (310) members of a proximity group to negotiate may include analysis system 130 establishing wireless communications with the members of a proximity group over network 190. The communication may be achieved via wifi, cellular telephone, Bluetooth, DSRC, V2V communication or some other method known to those with skill in the art. After communications have been established, analysis system 130 may provide each member of the proximity group with information corresponding to the detected automobile (e.g., unique vehicle ID, group being requested, frequency of observation data, etc).

Determining (320) whether the request was accepted may include analysis system 130 receiving a response from the each member of the proximity group. For the negotiation to continue, at least a selected number of requests must be accepted by the members of the proximity group. In some embodiments, a majority of the invited members must accept for the negotiation to be carried out. In other embodiments, the negotiation may continue if at least one member accepts the invitation. If enough invitations are accepted, then proximity group invitation method 300 proceeds with the negotiating a trust level operation 330. Otherwise, proximity group invitation method 300 terminates.

Negotiating (330) a trust level may include analysis system 130 first determining a suggested trust level. The suggested trust level may be based on the trust score that was calculated in the determine trust score operation 240 of FIG. 2. Analysis system 130 may provide the suggested trust level to the members of the proximity group involved in the negotiation. The current members of the proximity group may negotiate to try and agree upon an accepted trust level to be assigned to the detected automobile.

Determining (340) whether an agreement was reached may include analysis system 130 detecting if the negotiation ended with an agreed upon trust level corresponding to the detected automobile. If an agreement was reached, then proximity group invitation method 300 proceeds with the adding (350) operation. Otherwise, proximity group invitation method 300 terminates.

Including (350) the detected automobile in a group may include analysis system 130 retrieving rules (e.g., requirements) corresponding to the detected automobile. The rules may include personalized requirements which the detected automobile requires for an association with a group to be completed. Additionally, analysis system 130 may retrieve owner preferences, from an owner profile, that comprise owner indicated requirements (e.g., social media ratings, journey preferences, meeting location preferences) corresponding to the existing members of the group. The rules and preferences may be stored in databases on data server 140. If the rules and preferences are satisfied, the detected automobile is included in an appropriate group.

Exchanging (360) data may include analysis system 130 determining data and information that will be exchanged with the detected automobile. What data and information is exchanged may be determined based on the trust level of the detected automobile as well as setting in the owner profile. Information exchanged may include a concurrence about opportunities of mutual interest. After mutual interests are understood, and information is exchanged, analysis system 130 may inform the owner and/or operator of the automobile of current opportunities.

Figure 4:
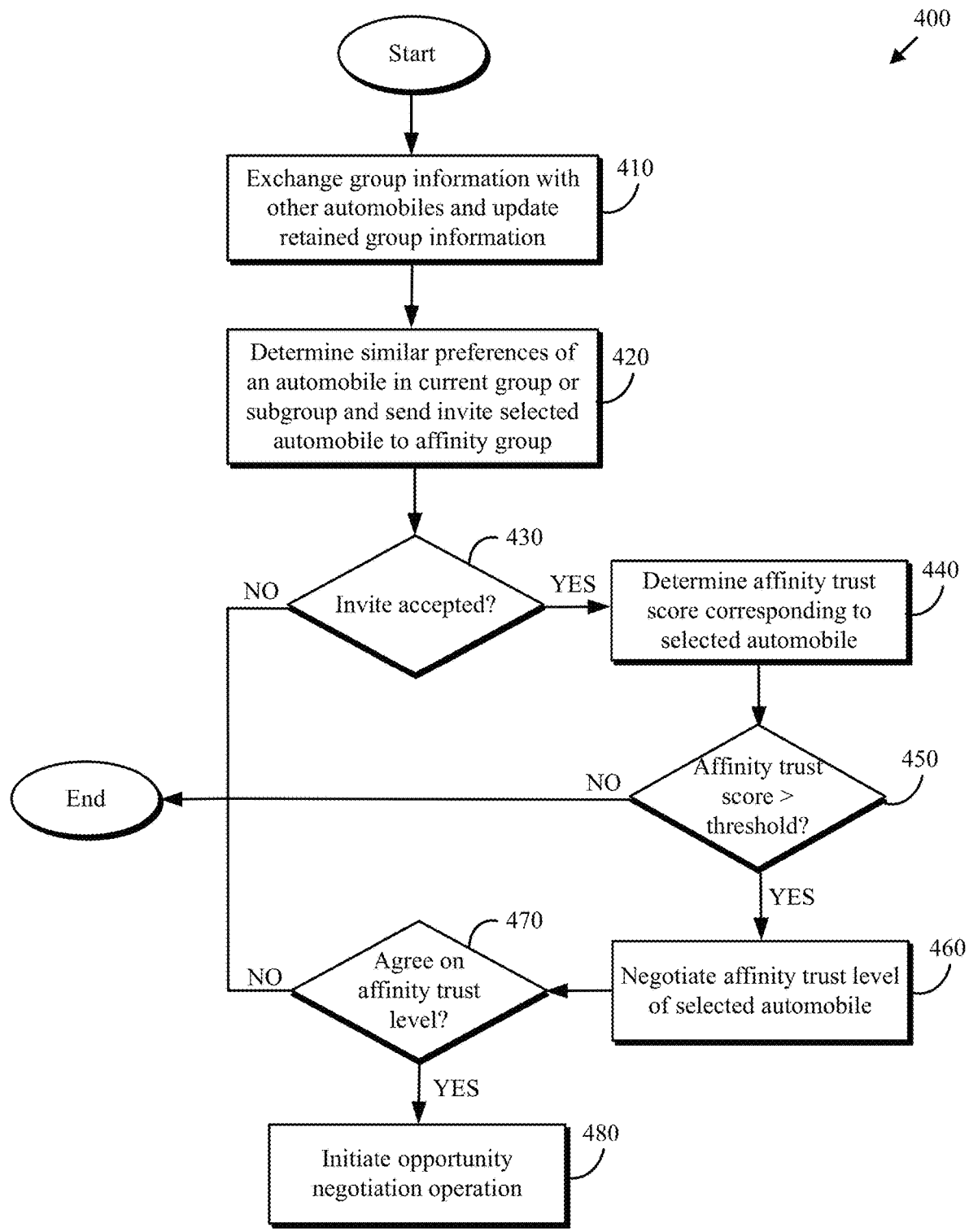
FIG. 4 is a flowchart depicting an affinity group qualification method, in accordance with at least one embodiment of the present invention.

FIG. 4 is a flowchart depicting affinity group qualification method 400, in accordance with at least one embodiment of the present invention. As depicted, affinity group qualification method 400 includes exchanging and updating (410) group information, determining (420) similar preferences, determining (430) whether an invitation was accepted, determining (440) an affinity trust score, determining (450) whether a threshold has been reached, negotiating (460) an affinity trust level, determining (470) whether an affinity trust level was agreed upon, and initiating (480) an opportunity negotiation operation. Affinity group qualification method 400 enables analysis system 130 to perform an affinity group qualification process. The affinity group qualification process may enable the exchange group information to determine if an opportunity exists for the formation of an affinity group or to add new members to an existing affinity group.

Exchanging and updating (410) group information may include analysis system 130 receiving and sending group information (e.g., information identifying group affiliations) with other members of a group. What information is shared may be based on previously agreed upon trust levels. Updated information may be retained in various databases on data server 140. The owner preferences may also be updated and retained in an owner profile (e.g., an owner social media data profile) that is retained on data server 140.

Determining (420) similar preferences may include analysis system 130 sending, to other automobiles in the same proximity group, information of interest when trying to form, or add members to, an affinity group (e.g., group membership ids, current routes, social data, etc.). The trust level of other automobiles in the proximity group may be used to determine what information is sent by analysis system 130. Analysis system 130 may identify similar automobiles from the current proximity group or other subgroups with similar grouping and deal preferences (e.g., automobiles that that frequently follow the same route, frequently stop at the same super market, and frequently stop as the same coffee shop). In some embodiments, analysis system 130 only acknowledges automobiles with similar preferences if they are in the same proximity group. In other embodiments, analysis system 130 acknowledges automobiles with similar preferences if they are in the same proximity group or in a subgroup of the proximity group, as long as the subgroup is within a selectable number of levels from the proximity group. Upon identifying an automobile with similar preferences, analysis system 130 may invite the automobile to join an affinity group for automobiles with the similar preferences.

Determining (430) whether an invitation was accepted may include analysis system 130 receiving a response from an automobile that was invited to join the affinity group. If the response indicates the invitation is accepted, then affinity group qualification method 400 proceeds to the determining an affinity trust score operation 440. Otherwise, affinity group qualification method 400 terminates.

Determining (440) an affinity trust score may include analysis system 130 analyzing the information corresponding to the invited automobile and using trust module 135 to calculate an affinity trust score. The affinity trust score may be used to determine if the invited automobile qualifies for entry in the affinity social grouping of automobiles. In some embodiments, the affinity trust score is calculated using previous trust score calculations, a VSS, and group preference score. A group preference score may be calculated using number of discounts obtained, number of group memberships, and other information shared by the invited automobile.

Determining (450) whether a threshold has been reached may include analysis system 130 comparing the calculated affinity trust score with one or more selected threshold values to determine if the affinity trust score has reached any of the one or more selected threshold values. Each threshold value may represent a minimum required affinity trust score to be invited to join a specific affinity group. If a trust score is reached, then affinity group qualification method 400 proceeds to negotiate an affinity trust level operation 460. Otherwise, affinity group qualification method 400 terminates.

Negotiating (460) an affinity trust level may include analysis system 130 first determining a suggested affinity trust level. The suggested affinity trust level may be based on the affinity trust score that was calculated in the determine affinity trust score operation 440. Analysis system 130 may provide the suggested affinity trust level to the members of the affinity group involved in the negotiation. The current members of the affinity group may negotiate and vote to try and agree upon an accepted affinity trust level to be assigned to the invited automobile.

Determining (470) whether an affinity trust level was agreed upon may include analysis system 130 detecting if the negotiation ended with an agreed upon affinity trust level corresponding to the invited automobile. If an agreement was reached, then the invited automobile is included in the affinity group and information corresponding to the invited automobile is added to the affinity group database. Subsequently, affinity group qualification method 400 proceeds with the initiate an opportunity negotiation operation 480. If an agreement was not reached, affinity group qualification method 400 terminates.

Initiating (480) an opportunity negotiation operation may include analysis system 130 determining an affinity group leader, and negotiating with external entities for deals (offers). The initiating an opportunity negotiation operation 480 will be described in greater detail with regard to FIG. 5.

Figure 5:
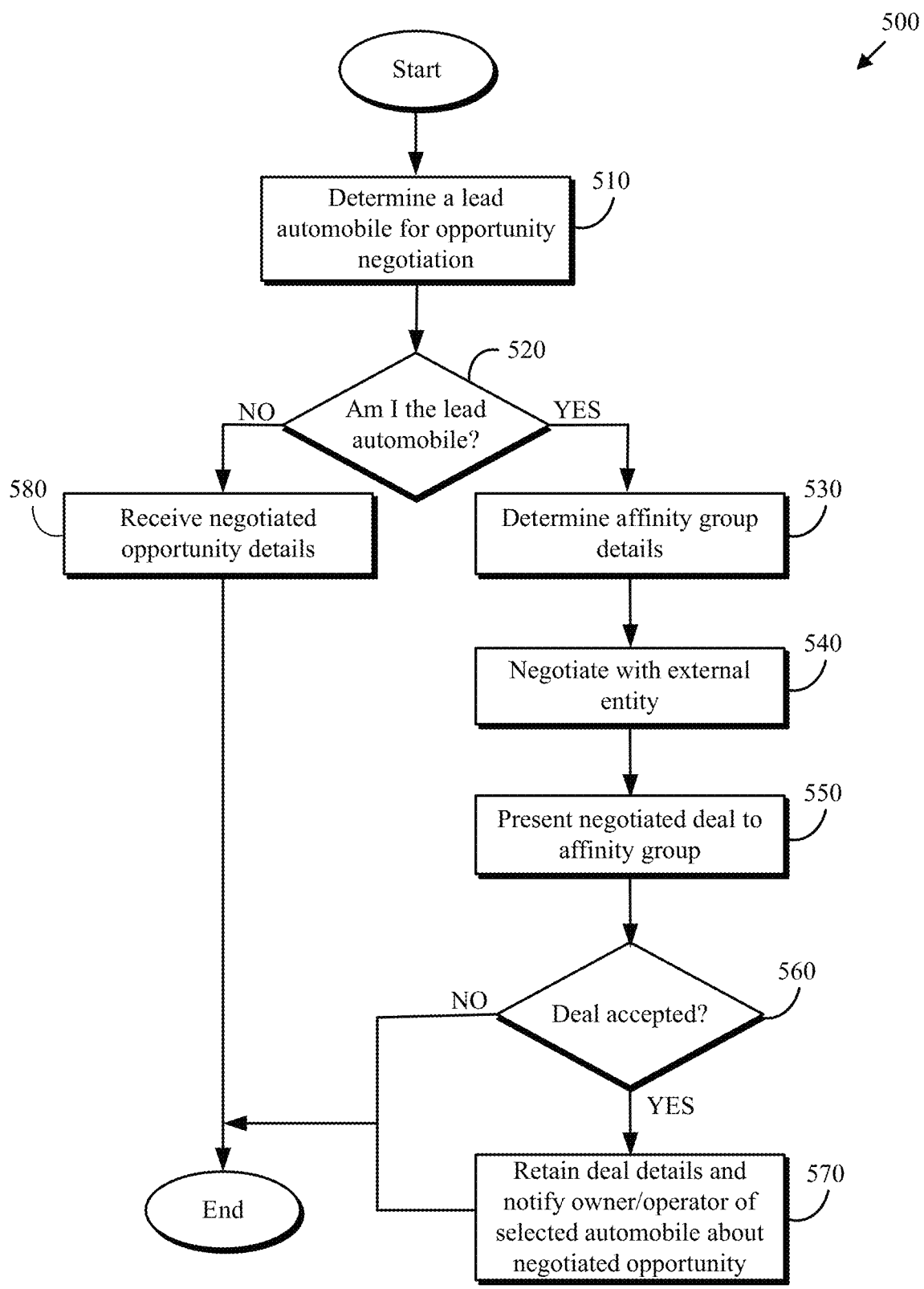
FIG. 5 is a flowchart depicting a opportunity negotiation method, in accordance with at least one embodiment of the present invention.

FIG. 5 is a flowchart depicting opportunity negotiation method 500, in accordance with at least one embodiment of the present invention. As depicted, opportunity negotiation method 500 includes determining (510) a lead automobile, determining (520) whether I am the lead automobile, determining (530) affinity group details, negotiating (540) with an external entity, presenting (550) a negotiated deal, determining (560) whether the deal was accepted, retaining (570) the deal details, and receiving (580) negotiated opportunity details. Opportunity negotiation method 500 enables a lead automobile to be selected, and also enables the lead automobile to negotiate deals with external entities on behalf of the members of an affinity group.

Determining (510) a lead automobile may include analysis system 130 determining that a potential deal of interest to the affinity group may exist. The members of the affinity group that are interested in the potential deal may select a lead automobile as a single point of contact when negotiating the potential deal with an external entity. In some embodiments, the lead automobile is determined by selecting the automobile in the affinity group with the highest affinity trust score. In other embodiments, the lead automobile is determined by selecting the automobile in the affinity group with the highest negotiated affinity trust level. In another embodiment, the lead automobile is determined by vote of automobiles in the affinity group.

Determining (520) whether I am the lead automobile may include analysis system 130 determining which automobile in the affinity group has been identified as the lead automobile. If analysis system 130 is the leader (e.g., analysis system 130 represents the automobile chosen as the leader), then opportunity negotiation method 500 proceeds with the determine affinity group details operation 530. Otherwise, opportunity negotiation method 500 proceeds to the receive negotiated opportunity details operation 580.

Determining (530) affinity group details may include analysis system 130 collecting information to determine the number of automobiles that are interested in the potential deal. Additionally, analysis system 130 may collect negotiating information, such as a discount rate expected by the interested automobiles.

Negotiating (540) with an external entity may include analysis system 130 obtaining and analyzing information about past negotiations with the external entity (e.g., details of past deals, willingness to accept counter offers, and responsiveness/expediency during a negotiation). Analysis system 130 may initiate communications with the external entity (e.g., a coffee shop) over network 190. Analysis system 130 may then indicate interest in negotiating a potential deal with the external entity. During the negotiation, analysis system 130 may provide group details (e.g., group size, age distribution, time of day near the external entity, day(s) of the week near the external entity, and the like) to the external entity. During the negotiation, analysis system 130 may present and receive counter offers until a potentially acceptable negotiated deal has been reached.

Presenting (550) a negotiated deal may include analysis system 130 providing information about the potential deal to the interested affinity group members. The interested affinity group members may review the deal and determine if the deal is acceptable. If the deal is not acceptable, analysis system 130 may continue to negotiate with the external entity.

Determining (560) whether the deal was accepted may include analysis system 130 getting a final decision from the interested affinity group members as to whether the negotiated deal is acceptable. If the deal is accepted, then opportunity negotiation method 500 proceeds to retain the deal details operation 570. Otherwise, opportunity negotiation method 500 terminates.

Retaining (570) the deal details may include analysis system 130 storing details of the negotiated deal in a deals database. In some embodiments, the deals database is a centralized database on data server 140. In other embodiments, each interested affinity member retains a local copy of the negotiated deal on persistent storage 138. In some embodiments, analysis system 130 provides completed details of the negotiated deal to the interested affinity group members. In some embodiments, analysis system 130 also notifies the owners and/or operators of the interested affinity group members about the negotiated deal. In other embodiments, the interested affinity members are responsible for informing the owners and/or operators about the negotiated deal.

Receiving (580) negotiated opportunity details may include analysis system 130 receiving, from an affinity group leader, details about a negotiated deal with an external entity. In some embodiments, the notification of the negotiated opportunity is in the form of broadcast message that is received by analysis system 130. In some embodiments, the broadcast message contains details of the negotiated opportunity. In other embodiments, the broadcast message informs analysis system 130 where the details of the negotiated opportunity are located (e.g., on data server 140). In some embodiments, analysis system 130 retains a copy of the deal information in local storage (e.g., persistent storage 138). In some embodiments, analysis system 130 informs the owner and/or operator of the automobile of the negotiated deal.

In addition to the social grouping aspects and negotiating deals, analysis system 130 may provide validated and trustworthy data to enable improved driving performance and reliability of self-driven automobiles. Analysis system 130 may also provide validated and trustworthy data to other external entities such as government or other agencies.

Figure 6:
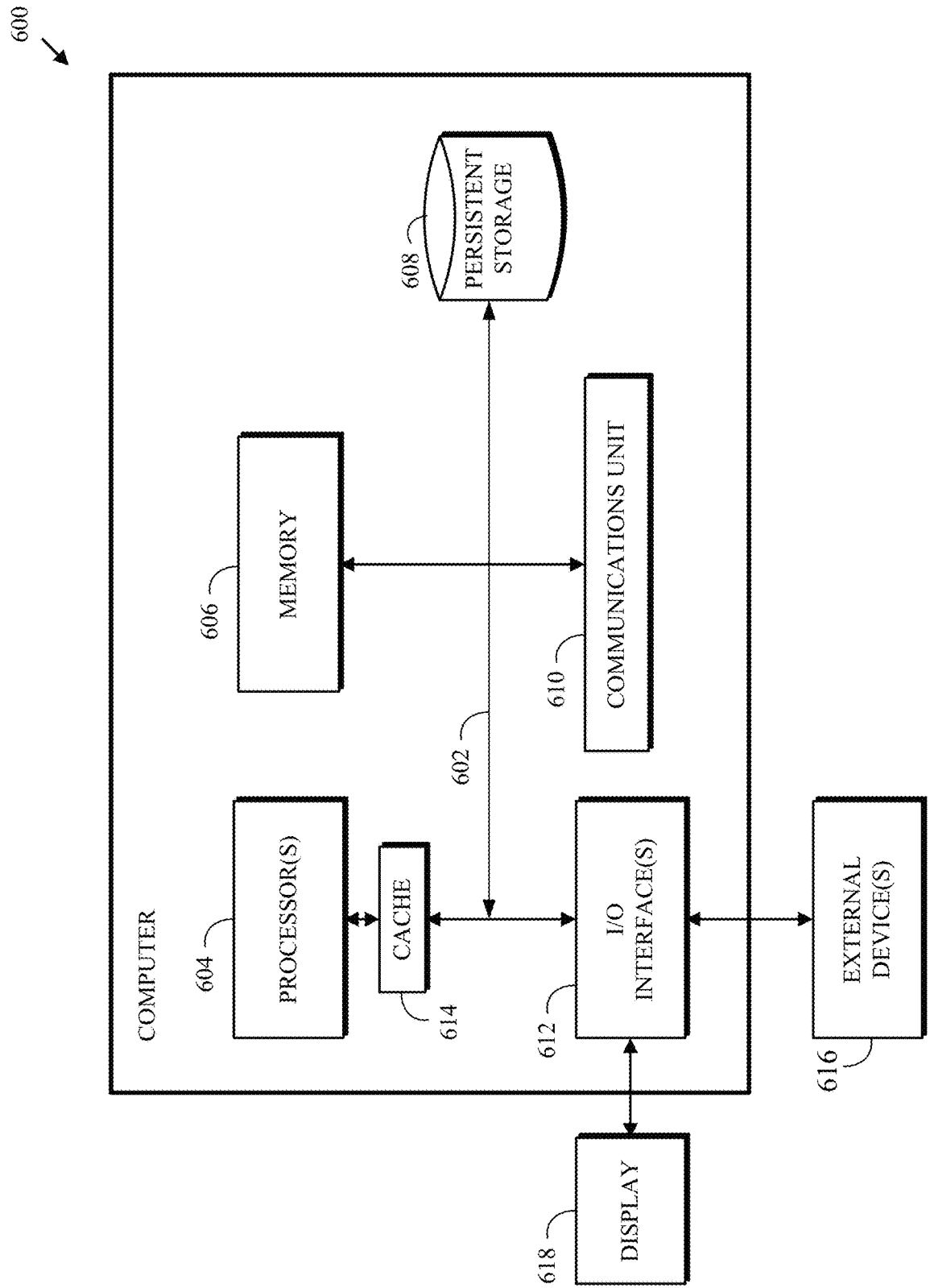
FIG. 6 is a functional block diagram depicting various components of one embodiment of a computer suitable for executing the methods disclosed herein.

FIG. 6 depicts a functional block diagram of components of a computer system 600, which is an example of systems such as analysis system 130 within communication environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Analysis system 130 includes processor(s) 604, cache 614, memory 606, persistent storage 608, communications unit 610, input/output (I/O) interface(s) 612 and communications fabric 602. Communications fabric 602 provides communications between cache 614, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 614 is a fast memory that enhances the performance of processor(s) 604 by holding recently accessed data, and data near recently accessed data, from memory 606.

Program instructions and data used to practice embodiments of the present invention, e.g., automobile detection method 200, proximity group invitation method 300, affinity group qualification method 400, and opportunity negotiation method 500 are stored in persistent storage 608 for execution and/or access by one or more of the respective processor(s) 604 via cache 614. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of analysis system 130. In these examples, communications unit 610 includes one or more network interface cards. Communications unit 610 may provide communications through the use of either or both physical and wireless communications links. Program instructions and data used to practice embodiments of automobile detection method 200, proximity group invitation method 300, affinity group qualification method 400, and opportunity negotiation method 500 may be downloaded to persistent storage 608 through communications unit 610.

I/O interface(s) 612 allows for input and output of data with other devices that may be connected to each computer system. For example, I/O interface(s) 612 may provide a connection to external device(s) 616 such as a keyboard, a keypad, a touch screen, a microphone, a digital camera, and/or some other suitable input device. External device(s) 616 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 618.

Display 618 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method executed by one or more processors, the method comprising:
    identifying, by a first automobile analysis system, a proximate automobile analysis system, wherein the first automobile analysis system is resident in a first automobile, and the proximate automobile analysis system is resident in a proximate automobile;
    determining, by the first automobile analysis system, a unique vehicle identification associated with the proximate automobile;
    receiving, from an affinity group database stored on a data server, information including an affinity group preferences dataset corresponding to an affinity group associated with the first automobile, wherein the affinity group preferences dataset is based on at least owner-provided information with respect to social media ratings, journey preferences, and meeting location preferences;
    determining a trust score corresponding to the proximate automobile, based at least in part, on (i) the unique vehicle identification, (ii) information in the affinity group preferences dataset, and (iii) a vehicle safety associated with the proximate automobile;
    conducting an affinity group qualification process responsive to the trust score exceeding a selected threshold value;
    sending, to the proximate automobile analysis system, an invitation into the affinity group responsive to the proximate automobile passing the affinity group qualification process;
    receiving, from the proximate automobile analysis system, an affirmative response to the invitation; and
    responsive to receiving the affirmative response: (i) accepting the proximate automobile into the affinity group, and (ii) sending, to the affinity group database, information corresponding to the proximate automobile.

2. The method of claim 1, further comprising obtaining offers from an external entity for members of the affinity group.

3. The method of claim 2, wherein the external entity is a business.

4. The method of claim 1, wherein the proximate automobile is selected from the group consisting of a mobile automobile, and a stationary automobile.

5. The method of claim 1, wherein:
    the trust score is calculated based on (i) the vehicle safety score, and (ii) a factor selected from the group consisting of: a number of times the proximate automobile has been identified, a result of a previous trust calculation, data received from an external agency, and data shared between other proximate automobiles,
    wherein the vehicle safety score is based on the unique vehicle identification, and further based on information retrieved from an external source associated with the proximate automobile, where the information includes factors selected from the group consisting of: accident history, a maintenance record, a traffic violation, a parking violation, a rating from another automobile, and a rating from an external agency.

6. The method of claim 1, wherein conducting the affinity group qualification process comprises performing an action selected from the group consisting of: comparing trust scores with other proximate automobiles, and voting by members of the affinity group.

7. The method of claim 1, wherein the selected threshold value is a minimum value at which the proximate automobile is accepted into a proximity group or the affinity group.

8. The method of claim 1, wherein an affinity group leader is determined by members of the affinity group.

9. A computer program product comprising:
    one or more computer readable storage media and program instructions stored on the one or more computer readable storage media, the program instructions comprising instructions executable by a computer to perform:
    identifying, by a first automobile analysis system, a proximate automobile analysis system, wherein the first automobile analysis system is resident in a first automobile, and the proximate automobile analysis system is resident in a proximate automobile;
    determining, by the first automobile analysis system, a unique vehicle identification associated with the proximate automobile;
    receiving, from an affinity group database stored on a data server, information including an affinity group preferences dataset corresponding to an affinity group associated with the first automobile, wherein the affinity group preferences dataset is based on at least owner-provided information with respect to social media ratings, journey preferences, and meeting location preferences;

determining a trust score corresponding to the proximate automobile, based at least in part, on (i) the unique vehicle identification, (ii) information in the affinity group preferences dataset, and (iii) a vehicle safety score associated with the proximate automobile;

conducting an affinity group qualification process responsive to the trust score exceeding a selected threshold value;

sending, to the proximate automobile analysis system, an invitation into the affinity group responsive to the proximate automobile passing the affinity group qualification process;

receiving, from the proximate automobile analysis system, an affirmative response to the invitation; and responsive to receiving the affirmative response: (i) accepting the proximate automobile into the affinity group, and (ii) sending, to the affinity group database, information corresponding to the proximate automobile.

10. The computer program product of claim 9, wherein the program instruction include instructions for obtaining offers from an external entity for members of the affinity group.

11. The computer program product of claim 10, wherein the external entity is a business.

12. The computer program product of claim 9, wherein the proximate automobile is selected from the group consisting of a mobile automobile, and a stationary automobile.

13. The computer program product of claim 9, wherein:
the trust score is calculated based on (i) the vehicle safety score, and (ii) a factor selected from the group consisting of: a number of times the proximate automobile has been identified, a result of a previous trust calculation, data received from an external agency, and data shared between other proximate automobiles;
wherein the vehicle safety score is based on the unique vehicle identification, and further based on information retrieved from an external source associated with the proximate automobile, where the information includes factors selected from the group consisting of: accident history, a maintenance record, a traffic violation, a parking violation, a rating from another automobile, and a rating from an external agency.

14. The computer program product of claim 9, wherein the program instructions for conducting the affinity group qualification process comprise instructions for performing an action selected from the group consisting of: comparing trust scores with other proximate automobiles, and voting by members of the affinity group.

15. The computer program product of claim 9, wherein the selected threshold value is a minimum value at which the proximate automobile is accepted into a proximity group or the affinity group.

16. The computer program product of claim 9, wherein an affinity group leader is determined by members of the affinity group.

17. A computer system comprising:
one or more computer processors;
one or more computer readable storage media;
program instructions stored on the computer readable storage media for execution by at least one of the computer processors, the program instructions comprising instructions to perform:

identifying, by a first automobile analysis system, a proximate automobile analysis system, wherein the first automobile analysis system is resident in a first automobile, and the proximate automobile analysis system is resident in a proximate automobile;

determining, by the first automobile analysis system, a unique vehicle identification associated with the proximate automobile;

receiving, from an affinity group database stored on a data server, information including an affinity group preferences dataset corresponding to an affinity group associated with the first automobile, wherein the affinity group preferences dataset is based on at least owner-provided information with respect to social media ratings, journey preferences, and meeting location preferences;

determining a trust score corresponding to the proximate automobile, based at least in part, on (i) the unique vehicle identification, (ii) information in the affinity group preferences dataset, and (iii) a vehicle safety score associated with the proximate automobile;

conducting an affinity group qualification process responsive to the trust score exceeding a selected threshold value;

sending, to the proximate automobile analysis system, an invitation into the affinity group responsive to the proximate automobile passing the affinity group qualification process;

receiving, from the proximate automobile analysis system, an affirmative response to the invitation; and responsive to receiving the affirmative response: (i) accepting the proximate automobile into the affinity group, and (ii) sending, to the affinity group database, information corresponding to the proximate automobile.

18. The computer system of claim 17, wherein the program instruction include instructions for obtaining offers from an external entity for members of the affinity group.

19. The computer system of claim 17, wherein:
the trust score is calculated based on (i) the vehicle safety score, and (ii) a factor selected from the group consisting of: a number of times the proximate automobile has been identified, a result of a previous trust calculation, data received from an external agency, and data shared between other proximate automobiles;
wherein the vehicle safety score is based on the unique vehicle identification, and further based on information retrieved from an external source associated with the proximate automobile, where the information includes factors selected from the group consisting of: accident history, a maintenance record, a traffic violation, a parking violation, a rating from another automobile, and a rating from an external agency.

20. The computer system of claim 17, wherein the program instructions for conducting the affinity group qualification process comprise instructions for performing an action selected from the group consisting of: comparing trust scores with other proximate automobiles, and voting by members of the affinity group.

* * * * *